(12) United States Patent
Zhou et al.

(10) Patent No.: US 8,526,713 B2
(45) Date of Patent: Sep. 3, 2013

(54) CONCAVE SURFACE MODELING IN IMAGE-BASED VISUAL HULL

(75) Inventors: Bingfeng Zhou, Beijing (CN); Jie Feng, Beijing (CN); Bencong Song, Beijing (CN)

(73) Assignee: Peking University, Beijing (CN)

( * ) Notice: Subject to any disclaimer, the term of this patent is extended or adjusted under 35 U.S.C. 154(b) by 236 days.

(21) Appl. No.: 12/995,751

(22) PCT Filed: Dec. 7, 2009

(86) PCT No.: PCT/CN2009/075367
§ 371 (c)(1),
(2), (4) Date: Dec. 2, 2010

(87) PCT Pub. No.: WO2011/069285
PCT Pub. Date: Jun. 16, 2011

(65) Prior Publication Data
US 2011/0262031 A1    Oct. 27, 2011

(51) Int. Cl.
*G06K 9/00* (2006.01)

(52) U.S. Cl.
USPC .......................................................... 382/154

(58) Field of Classification Search
USPC .......................................................... 382/154
See application file for complete search history.

(56) References Cited

U.S. PATENT DOCUMENTS

| 4,982,438 | A | 1/1991 | Usami et al. |
| 6,975,756 | B1 | 12/2005 | Slabaugh et al. |
| 7,486,817 | B2 | 2/2009 | Yanagawa et al. |
| 2002/0159628 | A1 * | 10/2002 | Matusik et al. ............... 382/154 |
| 2009/0154794 | A1 | 6/2009 | Kim et al. |
| 2009/0289940 | A1 | 11/2009 | Kimura et al. |

FOREIGN PATENT DOCUMENTS

| CN | 1665313 A | 9/2005 |
| CN | 101271591 A | 9/2008 |
| JP | 2001351119 A | 12/2001 |
| JP | 2008129950 A | 6/2008 |

OTHER PUBLICATIONS (Zhanfeng Yue, "View Synthesis of Articulating Human Using Visual Hull", 2003, ICME, I489-I492).*
Matusik, W., et. al., "Image-based visual hulls," Proceedings of the 27th annual conference on Computer graphics and interactive techniques SIGGRAPH, 2000, 369-374.
J. Feng, B. Song, and B. Zhou. Bottom and Concave Surface Rendering in Image-based Visual Hull, VRCAI 2008, Singapore, Dec. 8-9 2008.
J. Feng, B. Song, and B. Zhou. Bottom and Concave Surface Rendering in Image-based Visual Hull, The International Journal of Virtual Reality, 2009, 8(2):39-44.
Patent Cooperation Treaty Application No. PCT/CN2009/075367: International Search Report and Written Opinion dated Sep. 16, 2010, 12 pages.

* cited by examiner

*Primary Examiner* — Samir Ahmed
*Assistant Examiner* — Totam Le
(74) *Attorney, Agent, or Firm* — Woodcock Washburn LLP (57) ABSTRACT

Apparatus and methods disclosed herein provide for a set of reference images obtained from a camera and a reference image obtained from a viewpoint to capture an entire concave region of an object; a silhouette processing module for obtaining a silhouette image of the concave region of the object; and a virtual-image synthesis module connected to the silhouette processing module for synthesizing a virtual inside-out image of the concave region from the computed silhouette images and for generating a visual hull of the object having the concave region.

16 Claims, 12 Drawing Sheets

CONCAVE SURFACE MODELING IN IMAGE-BASED VISUAL HULL

CROSS-REFERENCE TO RELATED APPLICATIONS

This application is the National Stage of International Application No. PCT/CN2009/075367, filed Dec. 7, 2009, the disclosure of which is incorporated herein by reference in its entirety.

BACKGROUND

Image Based Rendering (IBR) is a method generating novel scenes from a set of reference images. The reference images are actual pictures of an object and color may be calculated from pixels in the reference images. Thus, IBR is a method for achieving photo realism. Image-based Visual Hull (IBVH) is a type of Image Based Rendering that may be used to reconstruct three-dimensional (3D) models from a group of reference images of an object. A conventional IBVH technique involves a 3D reconstruction method that takes a group of pictures as input, and produces a convex hull of the target object.

Figure 2:
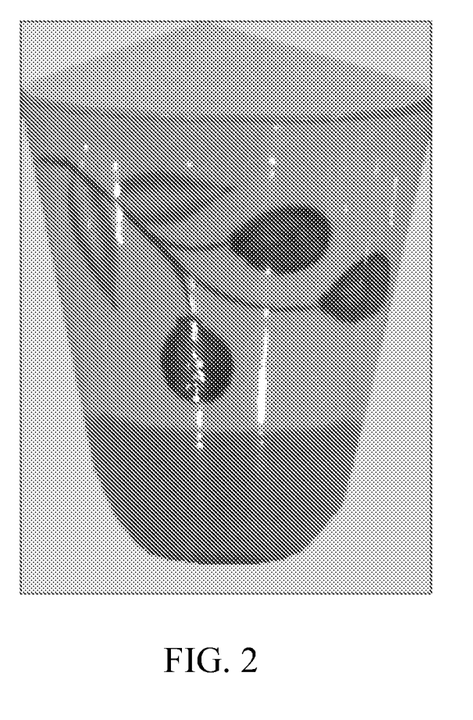
FIG. 2 illustrates a rendering result with protuberant shape distortion of a concave object using IBVH.

The conventional IBVH technique uses the object silhouette in reference images to recover the geometry information. However, a problem with this conventional technique is that the silhouette is not capable of revealing information of a concave region on the surface of an object (i.e., referred to as a concave object). Consequently, the concave object is difficult to reconstruct. In particular, the conventional IBVH technique can lead to a protuberant defect and subsequently diminished photo-realism. An example of a reconstructed object having a protuberant defect is shown in FIG. 2. The development of a protuberant defect is partly because the concave region is always surrounded by the rest of the object. Consequently, the conventional IBVH technique has problems in acquiring the geometry of the concave object with reference images.

SUMMARY

A method and computer readable medium storing a computer executable program is described in the present disclosure, the method, including obtaining a plurality of reference images of an object having a concave region, or concave regions; and generating a virtual inside-out image for the concave region(s) based on the reference images.

Alternatively, an apparatus is described in the present disclosure, the apparatus including storage for storing a plurality of reference images obtained from a camera for an object having a concave region and a reference image obtained from the viewpoint that captures the concave region of the object; a silhouette processing module obtaining a silhouette of each reference image; and a virtual image synthesis module obtaining a virtual inside-out image of the concave region and synthesizing a visual hull of the object.

Alternatively, an apparatus is described in the present disclosure, the apparatus including storage for storing a plurality of reference images of an object obtained from a camera and a reference image obtained from the viewpoint that captured the entire boundary of a concave region of the object; a silhouette processing module for obtaining a silhouette for each reference image and the boundary of the concave region; and a virtual-image synthesis module connected to the silhouette processing module for obtaining a virtual inside-out image of the concave region and synthesizing a visual hull for the object having the concave region based on the virtual inside-out image.

Alternatively, a method is described in the present disclosure, the method including obtaining a plurality of reference images of an object having a concave region; generating a virtual inside-out image for the concave region based on the reference images; and using the generated virtual inside-out image as a virtual reference image, and together with said reference images, obtaining a visual hull by performing a subtraction Boolean operation for corresponding segments mapped from the virtual reference image and performing an intersection Boolean operation for corresponding segments mapped from said reference images The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, among other things, to methods, apparatuses, computer programs and systems related to reconstructing an image of an object.

Figure 3A:
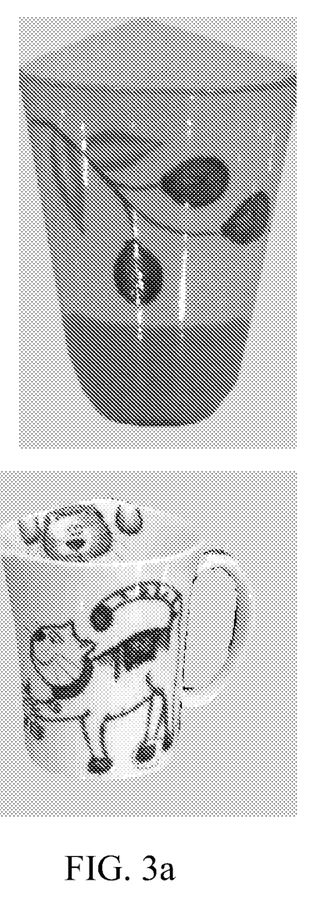
FIG. 3a illustrates an image before processing according to the disclosed method.
Figure 3B:
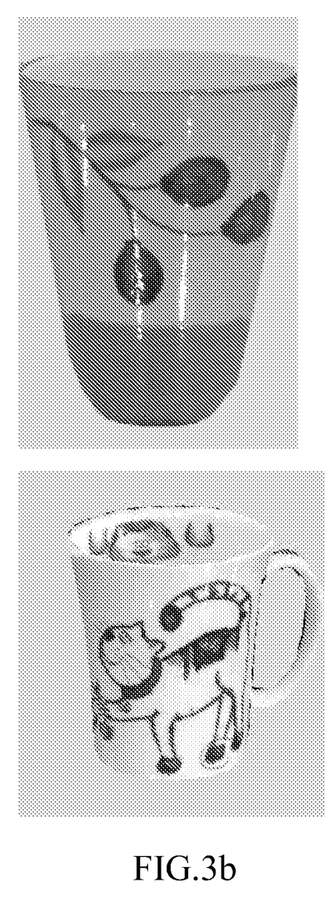
FIG. 3b illustrates rendering results using the concave object modeling method, according to an example embodiment.

As may be seen for example in FIGS. 3a and 3b, compared with rendering results of conventional processing methods (FIG. 3a), the disclosed approach of concave object modeling reconstructs the shape and the texture of the target concave object precisely, and produces high-quality photorealistic results (FIG. 3b).

According to an example embodiment of the present disclosure, a virtual camera and images are adopted to provide the visual silhouette cone which characterizes the geometry information of the concave object, while the texture information is provided by an image taken from directly above the concave object.

Figure 1:
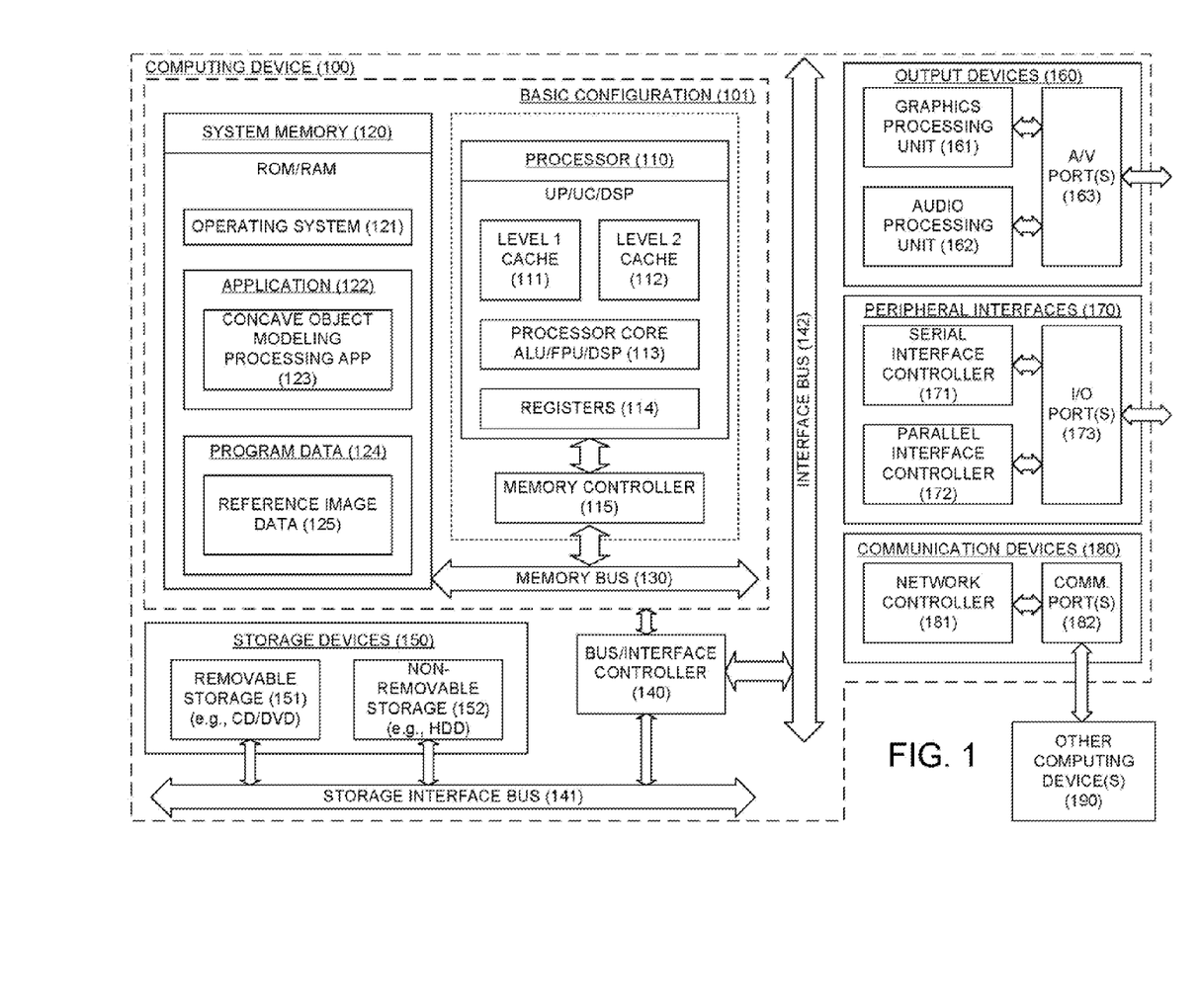
FIG. 1 is a block diagram illustrating an example of a configuration of a computing device arranged to reconstruct a displayed image in accordance with the method, according to an example embodiment.

FIG. 1 is a block diagram illustrating an example of a configuration of a computing device arranged to reconstruct a displayed image in accordance with the method.

FIG. 1 is a block diagram illustrating an example computing device 100 for implementing a pre-processing module, virtual-image synthesis module, and point relocation module. In a basic configuration 101, computing device 100 typically includes one or more processors 110 and system memory 120. A memory bus 130 may be used for communicating between the processor 110 and the system memory 120.

Depending on the desired configuration, processor 110 may be of any type including but not limited to a microprocessor (µP), a microcontroller (µC), a digital signal processor (DSP), or any combination thereof. Processor 110 may include one more levels of caching, such as a level one cache 111 and a level two cache 112, a processor core 113, and registers 114. The processor core 113 may include an arithmetic logic unit (ALU), a floating point unit (FPU), a digital signal processing core (DSP Core), or any combination thereof A memory controller 115 may also be used with the processor 110, or in some implementations the memory controller 115 may be an internal part of the processor 110.

Depending on the desired configuration, the system memory 120 may be of any type including but not limited to volatile memory (such as RAM), non-volatile memory (such as ROM, flash memory, etc.) or any combination thereof. System memory 120 typically includes an operating system 121, one or more applications 122, and program data 124. Application 122 includes a concave object modeling processing application 123 that is arranged to acquire and render an object. Program Data 124 includes reference image data 125, as will be further described below. In some embodiments, application 122 may be arranged to operate with program data 124 on an operating system 121. This described basic configuration is illustrated in FIG. 1 by those components within dashed line 101.

Computing device 100 may have additional features or functionality, and additional interfaces to facilitate communications between the basic configuration 101 and any required devices and interfaces. For example, a bus/interface controller 140 may be used to facilitate communications between the basic configuration 101 and one or more data storage devices 150 via a storage interface bus 141. The data storage devices 150 may be removable storage devices 151, non-removable storage devices 152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 120, removable storage 151 and non-removable storage 152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 100. Any such computer storage media may be part of device 100.

Computing device 100 may also include an interface bus 141 for facilitating communication from various interface devices (e.g., output interfaces, peripheral interfaces, and communication interfaces) to the basic configuration 101 via the bus/interface controller 140. Example output devices 160 include a graphics processing unit 161 and an audio processing unit 162, which may be configured to communicate to various external devices such as a display or speakers via one or more A/V ports 163. Example peripheral interfaces 170 include a serial interface controller 171 or a parallel interface controller 172, which may be configured to communicate with external devices such as input devices (e.g., keyboard, mouse, pen, voice input device, touch input device, etc.) or other peripheral devices (e.g., printer, scanner, etc.) via one or more I/O ports 173. An example communication device 180 includes a network controller 181, which may be arranged to facilitate communications with one or more other computing devices 190 over a network communication via one or more communication ports 182. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 100 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 100 may also be implemented as a personal computer including both laptop computer and non-laptop computer configurations.

Figure 4:
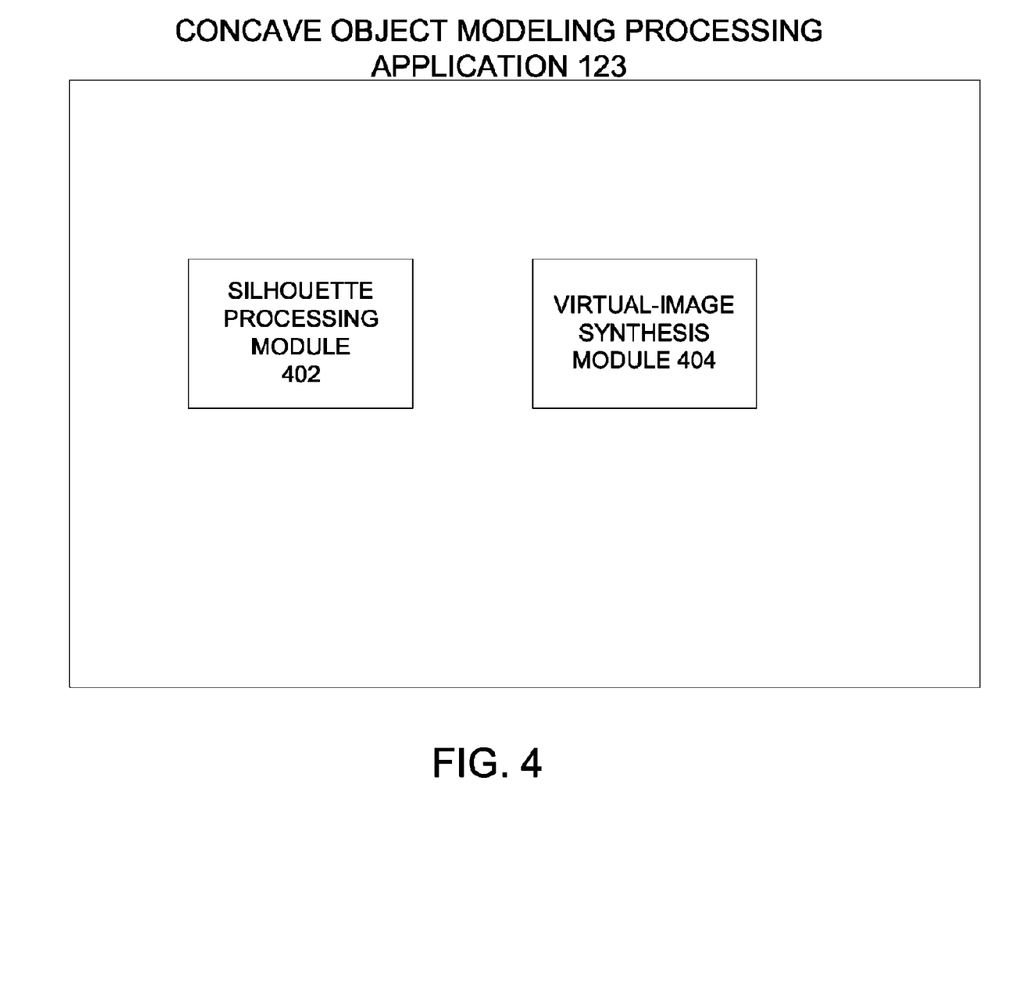
FIG. 4 is a block diagram illustrating modules executed in the computing device of FIG. 1, according to an example embodiment.

As illustrated in FIG. 4, the concave object modeling processing application 123 may include two parts: a silhouette processing module 402 and a virtual-image synthesis module 404. The silhouette processing module 402 captures or accesses images of an object and extracts the silhouette of the object. Virtual-image synthesis module 404 sets a virtual camera at the bottom of the concave object, maps the silhouette to the image space of the virtual camera, and synthesizes virtual images to form a visual hull.

The concave object modeling processing application 123 involves an IBVH technique which is based on shape-from-silhouette 3D reconstruction. Generally a shape-from-silhouette 3D reconstruction creates a geometric entity referred to as a silhouette cone. In shape-from-silhouette 3D reconstruction, the original image is subjected to thresholding to produce a foreground/background binary image, which is referred to as a silhouette image. A foreground mask, known as a silhouette, is the 2D projection of the corresponding 3D foreground object. Along with the camera viewing parameters, the silhouette defines a back-projected generalized cone that encompasses the 3D object. This generalized cone is the silhouette cone.

Figure 7:
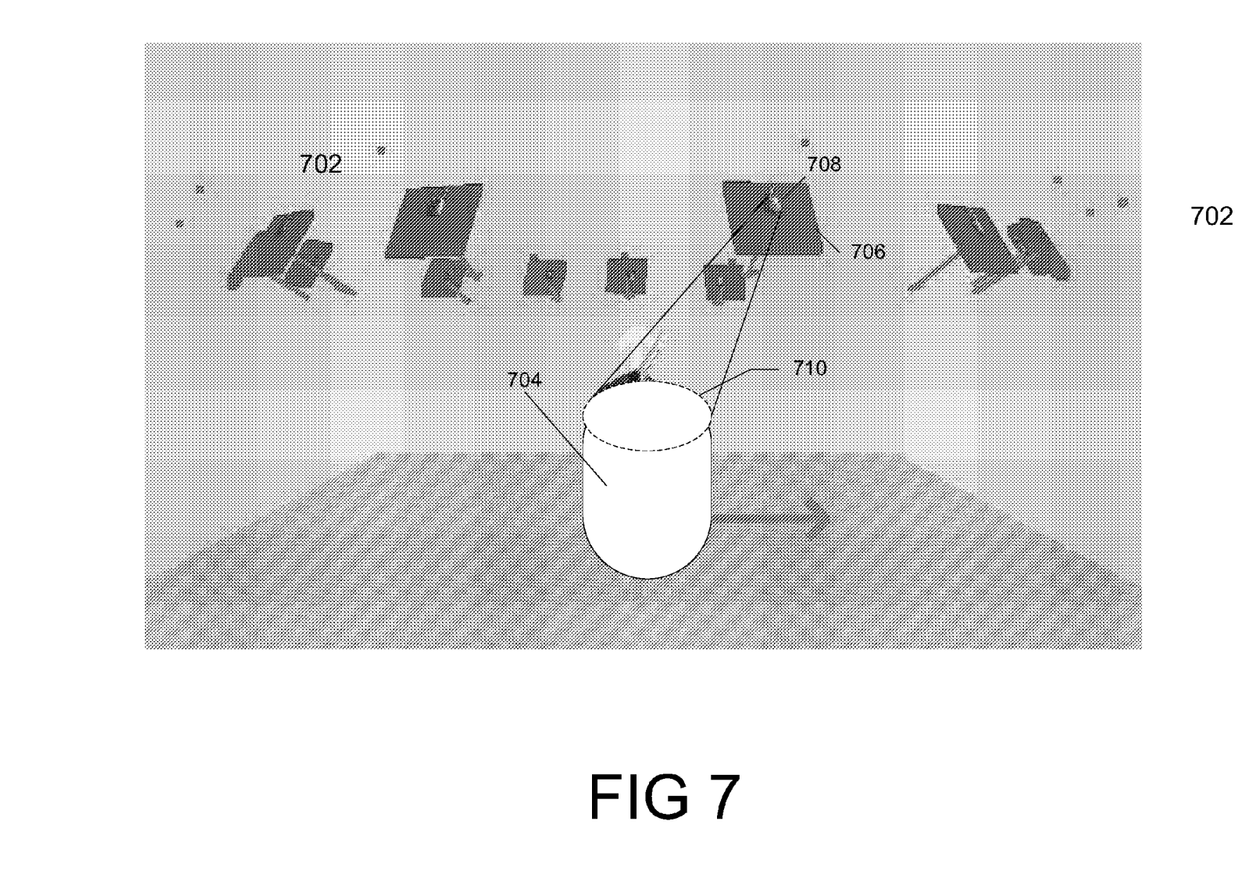
FIG. 7 is a conceptual view illustrating a visual hull obtained from reference images.

The Image-Based Visual Hull (IBVH) process produces a visual hull from an intersection of generalized cones. In general, the IBVH process takes a group of photos as input, and produces a convex hull of the target object. The convex hull is the visual hull for the object. In the process, each reference image is separated into foreground and background. The foreground mask, i.e. silhouette, along with the calibration information of the camera, defines a back-projected cone in 3D space that contains the target object. Calibration information of the camera includes focal length and camera position. The intersection of all silhouette cones forms the convex hull of the object. An example illustration of a visual hull is shown in FIG. 7.

Figure 5:
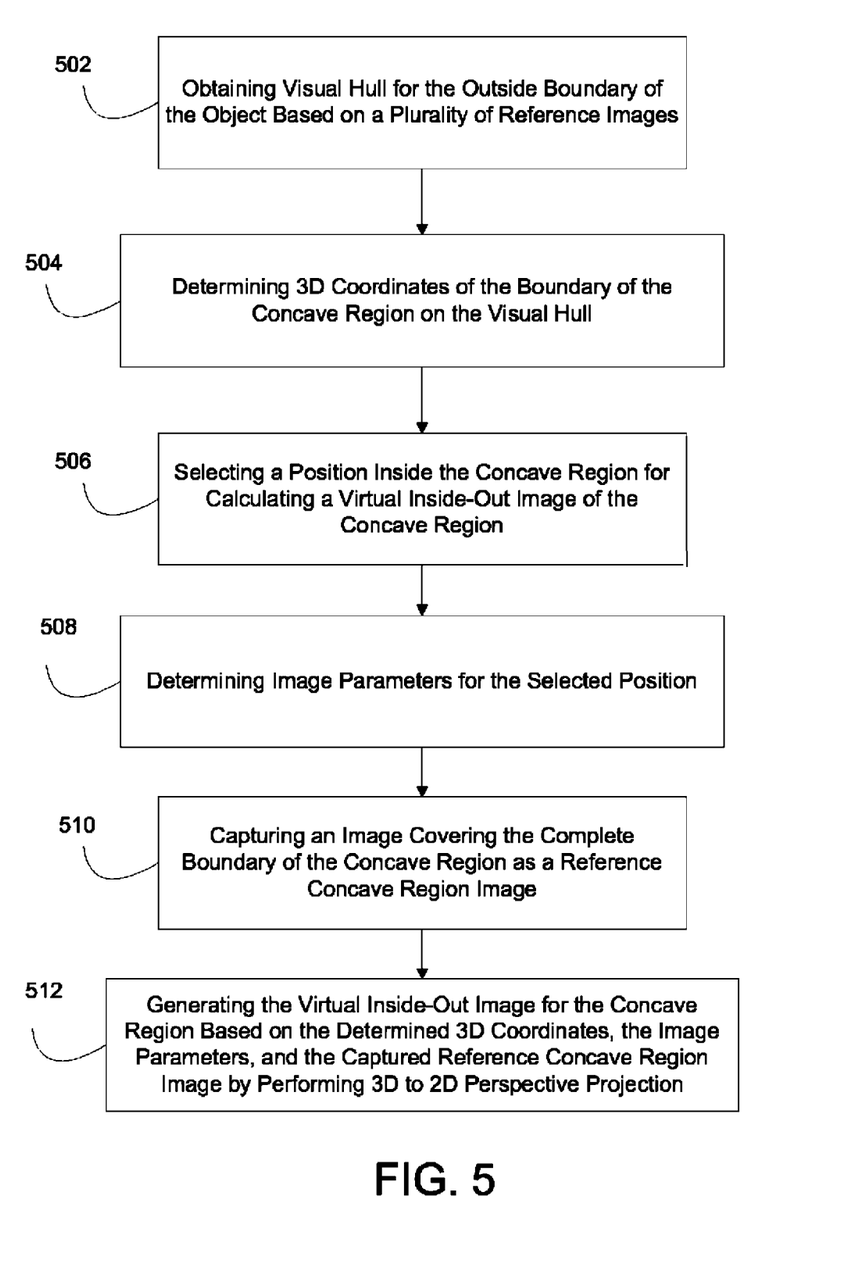
FIG. 5 is a flow diagram illustrating a method of generating a visual silhouette cone for the concave region of an object, according to an example embodiment.
Figure 6:
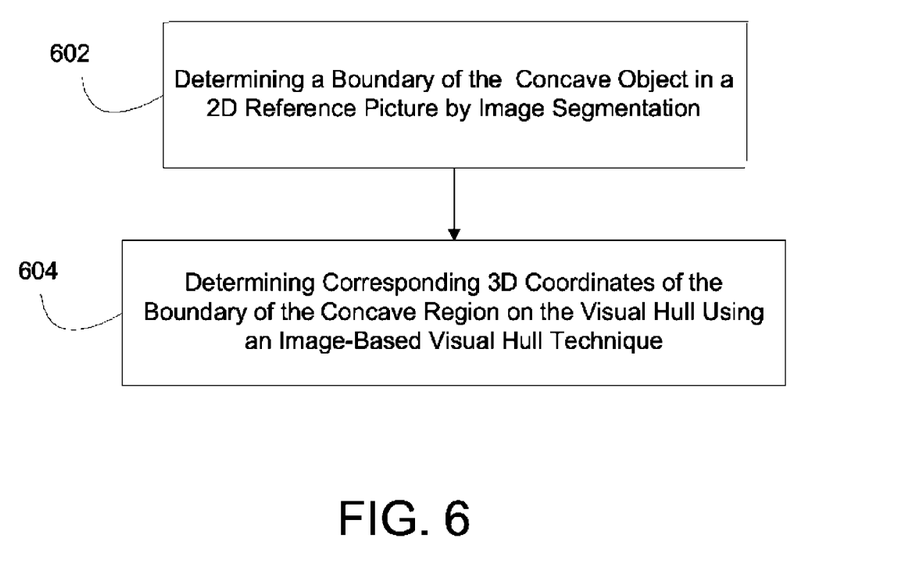
FIG. 6 is a flow diagram illustrating steps for a method of determining 3D coordinates of FIG. 5.
Figure 10A:
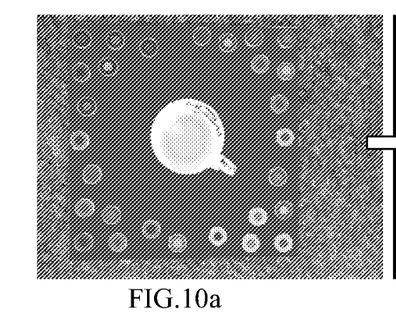
FIG. 10A is a reference image of an object taken from right above, according to an example embodiment.

FIGS. 5 and 6 illustrate a method that eliminates the protuberant shaped distortion from the visual hull for an object. The visual hull in FIG. 7 illustrates elements described in the method steps. As shown in FIG. 5, in step 502, a visual hull 704 for an object having a concave region is obtained from a group of photos as a set of reference images 702, which are taken from the perspective of the outside of the object. In FIG. 5, in Step 504, 3D coordinates of the concave region boundary are calculated on the visual hull. FIG. 10a shows an example reference concave region image taken from directly above the concave region.

FIG. 6 illustrates steps in performing step 504 of determining 3D coordinates of the boundary of the concave region on the visual hull.

In FIG. 6, step 602, the concave region boundary 708 on a 2D reference picture 706 is determined by manual interaction or an image segmentation technique.

The technique of image segmentation generally refers to a process of partitioning a digital image into multiple segments (sets of pixels; also known as superpixels). The goal of image segmentation is to simplify and/or change the representation of an image into something that is more meaningful and easier to analyze. In particular, image segmentation involves assigning a label to every pixel in an image such that pixels with the same label share certain visual characteristics. Image segmentation is used to locate objects and boundaries (lines, curves, etc.) in images. In the case of step 602, image segmentation can be used to locate the boundary for the concave region.

The result of image segmentation is a set of segments that collectively cover the entire image, or a set of contours extracted from the image. Each of the pixels in a region are similar with respect to some characteristic or computed property, such as color, intensity, or texture. Adjacent regions are significantly different with respect to the same characteristic(s).

Figure 10B:
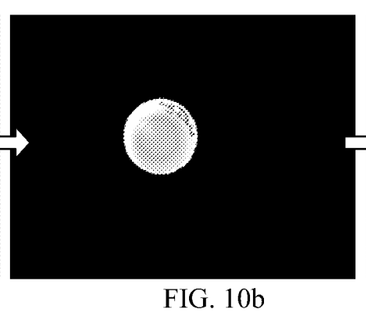
FIG. 10B illustrates intermediate results obtained using image segmentation, according to an example embodiment.

FIG. 10b shows an example of intermediate results obtained using image segmentation, in which the boundary of the concave region is identified.

In FIG. 6, step 604, 3D coordinates for the concave region boundary 710 on the visual hull 704 are determined using the concave region boundary 708 on the 2D reference picture 706 determined in Step 602 by projecting positions on the 2D reference picture back to 3D space. Steps in performing projection of positions on the 2D reference picture back to 3D space are IBVH process steps.

Continuing with the method illustrated in FIG. 5, in Step 506, a position for a virtual camera inside the concave region is chosen. A position of the virtual camera is chosen that corresponds to observing the object from inside of the concave region toward the outside. In one embodiment as shown for example in FIG. 8, a position at which the virtual camera is located at the center of the bottom of the concave region can be chosen. Alternatively, other positions such as one at the edge of the bottom of the concave region can be chosen as well. The chosen position allows a virtual inside-out image to be generated at such position to include a complete concave region boundary. Subsequently, several positions can be chosen as long as the virtual inside-out images cover the complete concave region boundary aggregately.

In Step 508, the camera parameters of the virtual camera are determined based on the selected position.

Figure 8:
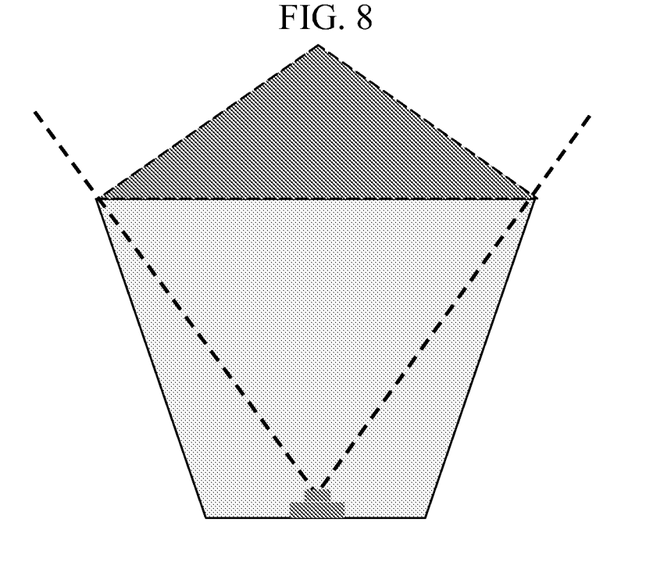
FIG. 8 illustrates the concept of a Virtual Camera for obtaining a virtual inside-out image of concave region, according to an example embodiment.

When the center of the virtual camera is set, the transformation vector of the external parameters of the camera is determined. For the rotation matrix of the external parameters, the three rotation angles are commonly set as a $\alpha=0$; $\beta=90$; $\gamma=0$, so that the orientation of the virtual camera stays upward and vertical to the bottom of the object, enabling simulation of capturing from the bottom directly under the concave object. For internal parameters, only the focal length f needs to be modified, other factors remain consistent with corresponding factors of an actual camera shooting reference images. Normally the focal length of the virtual camera depends on the depth of the concave object proportionally. Based on the known parameters of the camera shooting the reference images, the value of focal length f of the virtual image may be set such that the entire region of the concave region boundary is within the virtual image shot by the virtual camera.

The camera parameters are chosen such that the virtual inside-out images taken by the virtual camera based on those camera parameters cover the complete concave region boundary aggregately.

In Step 510, an image of the silhouette and the texture of the concave region is captured, for example, from outside and directly above the concave region, as a reference concave region image, in which a complete concave region boundary is included. Alternatively, several images can be taken as long as the complete concave region boundary can be covered by the several images aggregately.

In Step 512, the virtual inside-out image is generated based on the 3D coordinates of the concave region boundary generated in step 504, the camera parameters generated in step 508, and the reference concave region image obtained in step 510 by using a conventional technique for 3D to 2D perspective projection.

Figure 9:
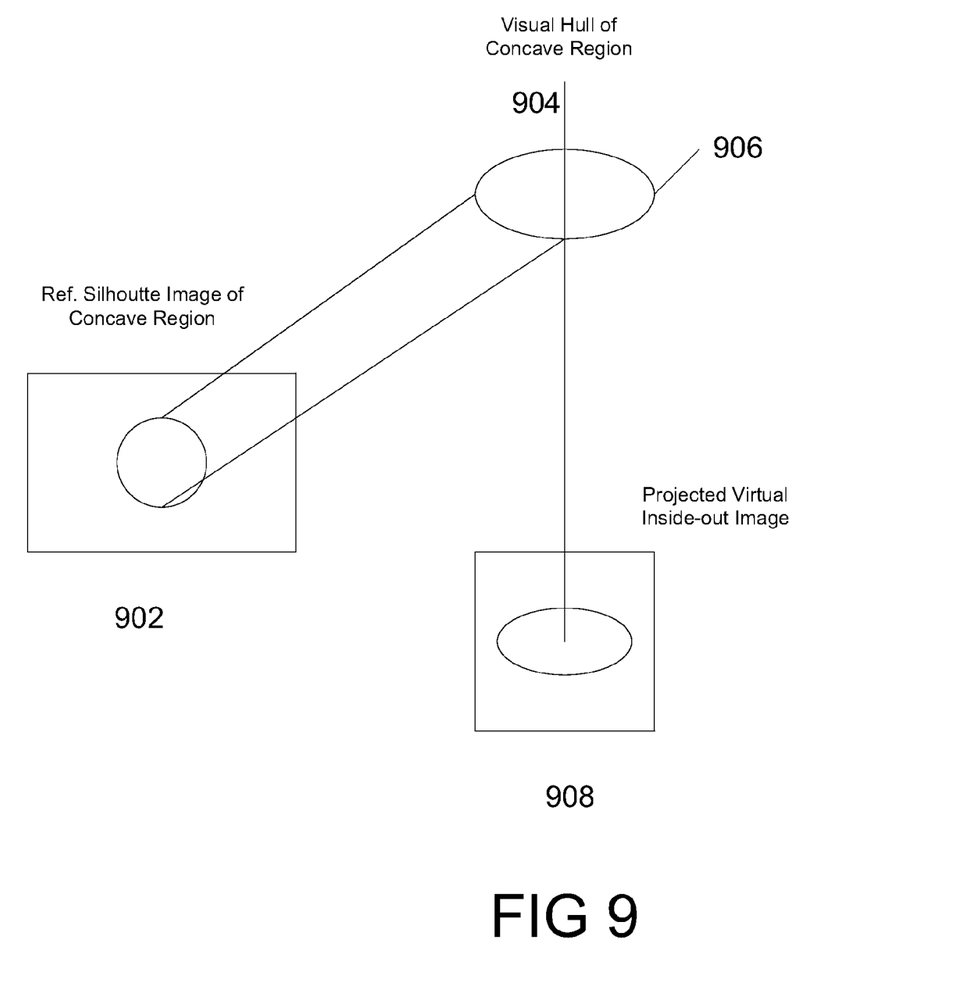
FIG. 9 illustrates a projected inside-out image of a concave region obtained by 3D to 2D perspective projection.

The step 512 of 3D to 2D perspective projection is illustrated in FIG. 9. The 3D to 2D perspective projection in step 512 is a method in which the reference concave region image 902, which is in a 2D plane, is projected into a 3D space 904. The concave region boundary 906 in the 3D space is projected to the virtual inside-out image 908 in a 2D plane.

One or several virtual inside-out images (with different virtual camera positions) can be generated as long as such one or several virtual inside-out images can cover the complete concave region boundary.

Figure 10C:
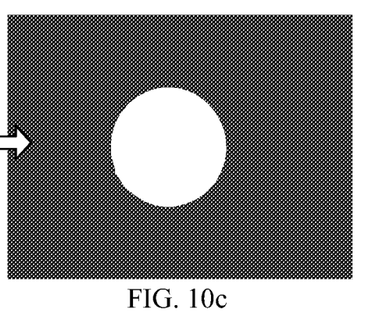
FIG. 10C illustrates a synthesized virtual image, according to an example embodiment.

FIG. 10c shows an example of a virtual inside-out image taken by the virtual camera.

The process of 3D to 2D perspective projection can be performed using a visual hull generated using an Image-Based Visual Hull (IBVH) process.

Furthermore, a revised visual hull of the concave object can be generated using the original reference images along with one or several virtual inside-out images as additional reference images. The one or several virtual inside-out images are used as a reference image(s), and the segments between the intersection points of the virtual inside-out image are subtracted (via subtraction Boolean operation) from the view ray. Also, in the case that several virtual inside-out images are used as a reference image, the segments of them are subtracted aggregately.

In particular, in generating a revised visual hull for the concave object, a subtraction Boolean operation is carried out for the segments mapped from the virtual inside-out image generated based on the virtual camera, and an intersection Boolean operation is carried out for the segments mapped from other reference pictures.

Figure 11:
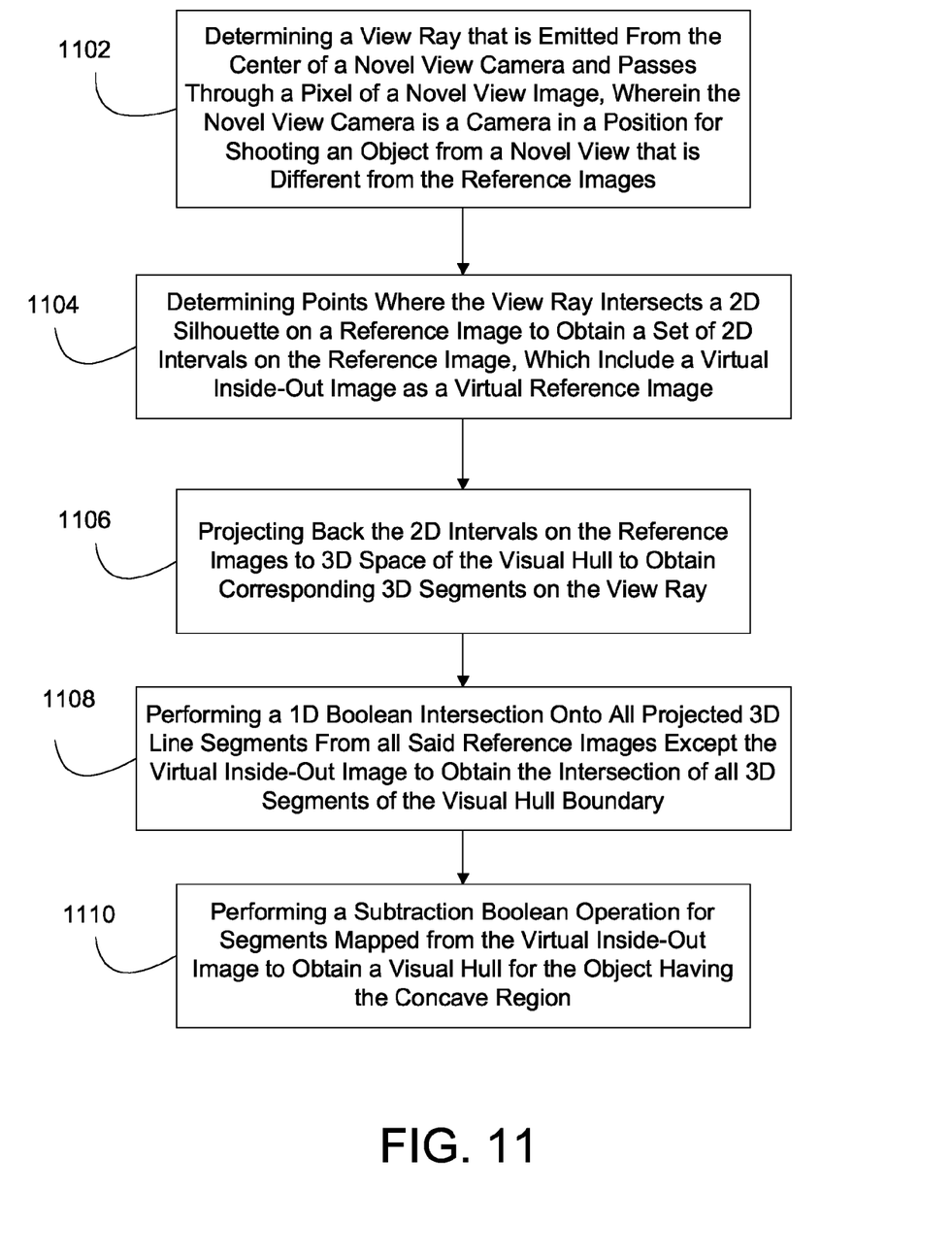
FIG. 11 is a flow diagram illustrating a method of determining a visual hull using the projected inside-out image of a concave region as a reference image.
Figure 12:
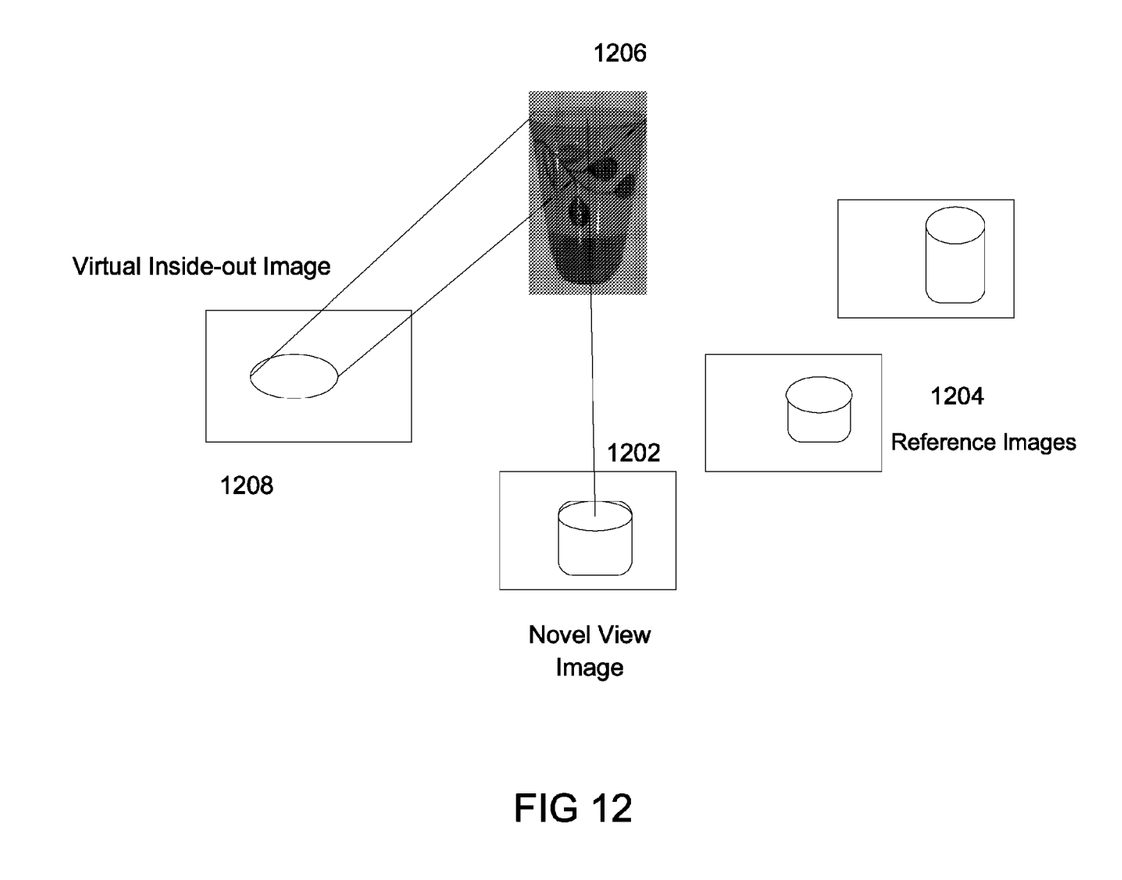
FIG. 12 illustrates a visual hull obtained using the projected inside-out image of a concave region as a reference image.

An example that demonstrates steps in calculating a revised visual hull for the concave region is illustrated in FIG. 12, and involves the following steps as depicted in FIG. 11.

In FIG. 11, step 1102, for a pixel of a novel view image (1202 in FIG. 12) which is shot by a novel camera (the "novel" camera means an actual camera that is shooting the object from a novel view which is different from the viewing direction of all other reference images 1204 in FIG. 12), a view ray is calculated, which is emitted from the center of the novel camera and passes through the pixel of the novel view image. The projection of this view ray on a reference image 1204, i.e. the projected view ray, can be determined by using the position information of the novel camera.

In a similar manner, a projected view ray is also determined for virtual inside-out images 1208 as virtual reference images.

In FIG. 11, step 1104, points where the projected view ray intersects the 2D silhouette on the reference image 1204 result in a set of 2D intervals on the reference image.

In FIG. 11, step 1106, 2D intervals on the reference image are projected back to 3D space 1206 such that corresponding 3D segments on the view ray are obtained.

In FIG. 11, step 1108, a 1D Boolean intersection operation is carried out onto all the projected 3D line segments from all of the reference images 1204, the result of which, i.e. the intersection of all the 3D segments from all the reference images 1204, indicates the visual hull boundary for the pixel of the novel view image.

In FIG. 11, step 1110, a 2D interval on the one or more virtual inside-out images 1208 is projected back to 3D space 1206 to obtain a corresponding segment(s) on the view ray; then, a subtraction Boolean operation is performed for the segments mapped from the virtual inside-out image and the view ray in order to obtain a visual hull for the object having the concave region.

In accordance with the methods, computer-readable storage mediums and apparatuses disclosed herein, virtual inside-out images of a concave region or concave regions of an object can be generated. The virtual inside-out images enable a view of an object that is not possible to obtain using conventional image-based visual hull techniques. In addition, the virtual inside-out images can be used in generating a refined visual hull of an object having a concave region, in which the visual hull accurately portrays the geometry of the object. In addition, the refined visual hull can be used to obtain photo-realistic images of the object that are without the protuberant defect.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk(DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
    obtaining, at a computing device, a plurality of reference images of an object having a concave region; and
    generating, at the computing device, a virtual inside-out image for the concave region based on the plurality of reference images by:
    obtaining a visual hull for an outside boundary of the object based on the plurality of reference images;
    determining three-dimensional coordinates of a boundary of the concave region on the visual hull;
    selecting a position inside the concave region for calculating the virtual inside-out image for the concave region;
    determining image parameters for the position;
    capturing a reference concave region image comprising the boundary of the concave region; and
    generating the virtual inside-out image for the concave region based on the three-dimensional coordinates, the image parameters, and the reference concave region image by performing three-dimensional to two-dimensional perspective projection.

2. The method of claim 1, wherein determining the three-dimensional coordinates of the boundary of the concave region comprises:
    determining the boundary of the concave region in a two-dimensional reference picture by image segmentation; and
    determining the three-dimensional coordinates of the boundary of the concave region on the visual hull using the boundary of the concave region in the two-dimensional reference picture.

3. The method of claim 1, further comprising obtaining a revised visual hull by performing a subtraction Boolean operation for segments mapped from each of the plurality of reference images to the virtual inside-out image.

4. The method of claim 1, wherein generating the virtual inside-out image comprises generating a plurality of virtual inside-out images, and wherein the method further comprises obtaining a revised visual hull by performing a subtraction Boolean operation for segments mapped from each of the plurality of reference images to each of the plurality of virtual inside-out images.

5. A non-transitory computer-readable storage medium storing a computer executable program code that, when executed by a computer, performs a method comprising:
   obtaining a plurality of reference images of an object having a concave region; and
   generating a virtual inside-out image for the concave region based on the plurality of reference images by effectuating operations comprising:
      obtaining a visual hull for an outside boundary of the object based on the plurality of reference images;
      determining three-dimensional coordinates of a boundary of the concave region on the visual hull;
      selecting a position inside the concave region for calculating the virtual inside-out image for the concave region;
      determining image parameters for the position;
      capturing a reference concave region image comprising the boundary of the concave region; and
      generating the virtual inside-out image for the concave region based on the three-dimensional coordinates, the image parameters, and the reference concave region image by performing three-dimensional to two-dimensional perspective protection.

6. The non-transitory computer-readable storage medium of claim 5, wherein determining the three-dimensional coordinates of the boundary of the concave region comprises:
   determining the boundary of the concave region in a two-dimensional reference picture by image segmentation; and
   determining the three-dimensional coordinates of the boundary of the concave region on the visual hull using the boundary of the concave region in the two-dimensional reference picture.

7. The non-transitory computer-readable storage medium of claim 5, wherein the method further comprises obtaining a revised visual hull by performing a subtraction Boolean operation for segments mapped from each of the plurality of reference images to the virtual inside-out image.

8. The non-transitory computer-readable storage medium of claim 5, wherein generating the virtual inside-out image comprises generating a plurality of virtual inside-out images, and wherein the method further comprises obtaining a revised visual hull by performing a subtraction Boolean operation for segments mapped from each of the plurality of reference images to each of the plurality of virtual inside-out images.

9. An apparatus, comprising:
   a storage medium configured to store a plurality of reference images of an object;
   a processor coupled to the storage medium, wherein the processor is configured to generate a virtual inside-out image for a concave region based on the plurality of reference images by effectuating operations comprising:
      obtaining a visual hull for an outside boundary of the object based on the plurality of reference images;
      determining three-dimensional coordinates of a boundary of the concave region on the visual hull;
      selecting a position inside the concave region for calculating the virtual inside-out image for the concave region;
      determining image parameters for the position;
      capturing a reference concave region image comprising the boundary of the concave region; and
      generating the virtual inside-out image for the concave region based on the three-dimensional coordinates, the image parameters, and the reference concave region image by performing three-dimensional to two-dimensional perspective protection.

10. The apparatus of claim 9, wherein determining the image parameters for the position comprises determining virtual camera parameters comprising focal distance.

11. The apparatus of claim 10, wherein the position is located at the bottom of the concave region of the object.

12. The apparatus of claim 9, wherein operations further comprise obtaining a revised visual hull by performing a subtraction Boolean operation for segments mapped from each of the plurality of reference images to the virtual inside-out image.

13. The apparatus of claim 9, wherein the operations further comprise:
   generating a plurality of virtual inside-out images, and
   obtaining a revised visual hull by performing a subtraction Boolean operation for segments mapped from each of the plurality of reference images to each of the plurality of virtual inside-out images.

14. The method of claim 1, wherein determining the image parameters for the position comprises determining virtual camera parameters comprising focal distance.

15. The non-transitory computer-readable storage medium of claim 5, wherein determining the image parameters for the position comprises determining virtual camera parameters comprising focal distance.

16. The apparatus of claim 9, wherein determining the three-dimensional coordinates of the boundary of the concave region comprises:
   determining the boundary of the concave region in a two-dimensional reference picture by image segmentation; and
   determining the three-dimensional coordinates of the boundary of the concave region on the visual hull using the boundary of the concave region in the two-dimensional reference picture.

* * * * *

UNITED STATES PATENT AND TRADEMARK OFFICE
CERTIFICATE OF CORRECTION

PATENT NO. : 8,526,713 B2  Page 1 of 1
APPLICATION NO. : 12/995751
DATED : September 3, 2013
INVENTOR(S) : Zhou et al.

It is certified that error appears in the above-identified patent and that said Letters Patent is hereby corrected as shown below:

In the Specification

Column 3, Line 8, delete "hereof In" and insert -- hereof. In --, therefor.

Column 3, Line 55, delete "thereof" and insert -- thereof. --, therefor.

In the Claims

Column 11, Line 18, in Claim 5, delete "the boundary" and insert -- the first boundary --, therefor.

Column 11, Line 23, in Claim 5, delete "protection." and insert -- projection. --, therefor.

Column 12, Line 15, in Claim 9, delete "protection." and insert -- projection. --, therefor.

Column 12, Line 22, in Claim 12, delete "wherein" and insert -- wherein the --, therefor.

Signed and Sealed this
Tenth Day of June, 2014

Michelle K. Lee
*Deputy Director of the United States Patent and Trademark Office*